United States Patent [19]
Zhang

[11] Patent Number: 5,921,887
[45] Date of Patent: Jul. 13, 1999

[54] HYDRAULIC CONTROL SYSTEM OF AN AUTOMATIC TRANSMISSION

[75] Inventor: Changeuk Zhang, Kyungki-do, Rep. of Korea

[73] Assignee: Hyundai Motor Company, Seoul, Rep. of Korea

[21] Appl. No.: 08/879,935

[22] Filed: Jun. 20, 1997

[30] Foreign Application Priority Data

Jun. 20, 1996 [KR]   Rep. of Korea ...................... 96-22555

[51] Int. Cl.⁶ .................................................. F16H 61/26
[52] U.S. Cl. ............................................ 477/127; 477/130
[58] Field of Search ..................... 477/127, 130, 477/131, 155

[56] References Cited

U.S. PATENT DOCUMENTS

| | | | |
|---|---|---|---|
| 3,895,547 | 7/1975 | Murakami | 477/156 |
| 3,949,627 | 4/1976 | Murakami | 477/159 |
| 4,385,531 | 5/1983 | Kobayashi et al. | 477/53 |
| 4,462,279 | 7/1984 | Sumiya | 477/141 |
| 5,383,825 | 1/1995 | El-Khoury et al. | 477/149 |

*Primary Examiner*—Charles A. Marmor
*Assistant Examiner*—Scott Lund

[57] ABSTRACT

A hydraulic control system for automatic transmission, which has a plurality of friction elements for selectively transmitting rotational force of a torque convertor to gear elements therein, controls engagement of the plurality of friction elements in proportion to forward and reverse speeds by operation of a plurality of valves for regulating, controlling and distributing hydraulic fluid supplied by an oil pump. The hydraulic control system includes a manual valve moving based on operation of a shift select lever by a user to select an operation range. The manual valve controls the supply of hydraulic fluid to at least one of the plurality of valves such that the hydraulic fluid generated by the oil pump is used as lubricating fluid for the torque convertor when the shift select lever is in a park operation range.

6 Claims, 3 Drawing Sheets

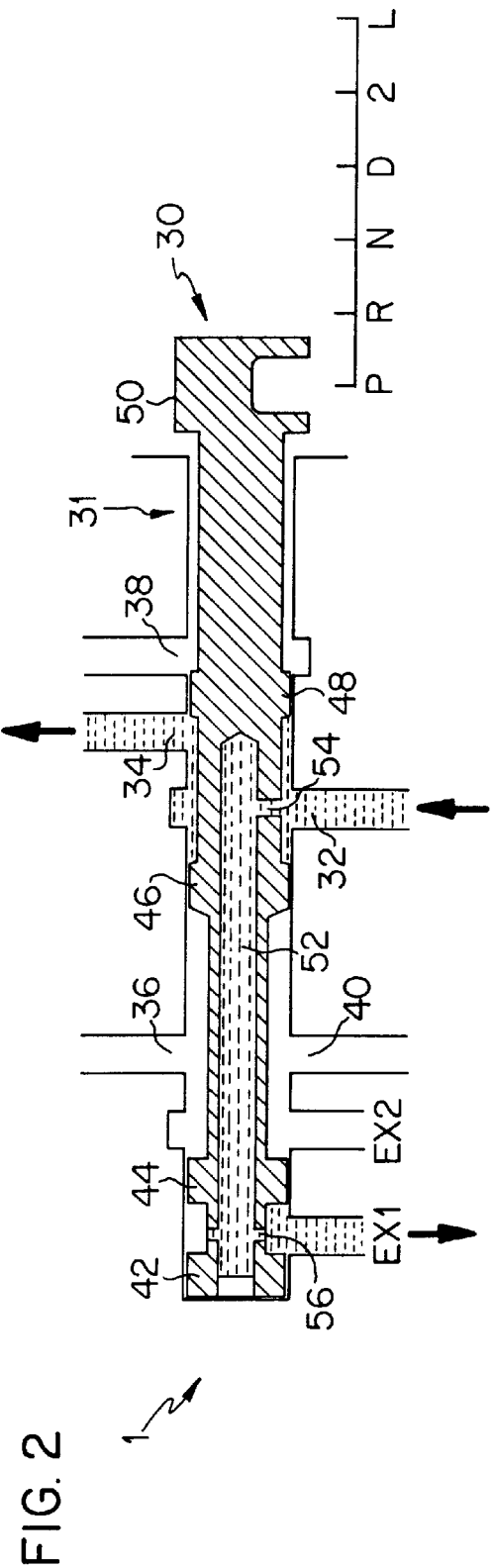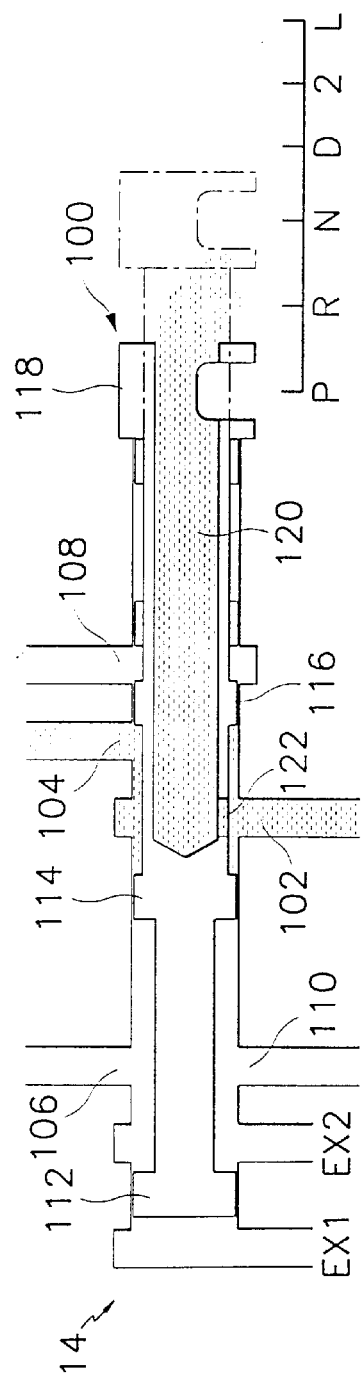
FIG. 2
FIG. 3 (PRIOR ART)

HYDRAULIC CONTROL SYSTEM OF AN AUTOMATIC TRANSMISSION

FIELD OF THE INVENTION

The present invention relates to a hydraulic control system of an automatic transmission used in vehicles, and more particularly, to a lubricating fluid control structure in a parking range of an automatic transmission which prevents internal damage to the automatic transmission by enabling lubricating fluid to be supplied to a torque convertor while in the parking P range.

BACKGROUND OF THE INVENTION

Generally, automatic transmissions used in vehicles enable the transmitting of drive power of an engine to a gear train through a torque convertor, the torque convertor acting as a hydraulic clutch. The gear train is connected to one or more planetary gear set, and uses one of the three elements of a planetary gearset (sun gear, ring gear, and planetary carrier) to be an input element, one to be a reaction element, and the remaining element to be an output element such that an appropriate shift ratio can be output.

A plurality of friction elements and a one-way clutch are used to enable selection of the above elements of the planetary gearset as an input element, reaction element, and output element. Also, the friction elements are selectively controlled at proper times to realize shifting by a hydraulic control system, the hydraulic control system including solenoid valves which are controlled by a transmission control unit (TCU).

The hydraulic control system, as shown in FIG. 4, generally includes an oil pump 2 which continuously pumps oil to create hydraulic pressure while the engine is running, a torque convertor 4 for transmitting engine power to an input axle of the transmission, a regulator valve 6 which controls the hydraulic pressure created by the oil pump 2 to a fixed level of pressure (i.e., line pressure), a torque convertor control valve 8 for controlling the hydraulic pressure of the torque convertor 4 and that for lubrication to a fixed level, and a damper clutch control valve 10 for controlling hydraulic pressure operating on a damper clutch mounted in the torque convertor 4.

There is further provided a reducing valve 12 which reduces hydraulic pressure to a fixed level below line pressure, a manual valve 14 moving in unison with a shift select lever (not shown) and which converts lines to supply or exhaust line pressure to or from each valve, and a shift control valve 16 for converting lines by ON/OFF operations of two shift control solenoid valves S1 and S2. Also, the hydraulic control system includes an input control valve 18 controlled by an input control solenoid S3 and which prevents shift shock during shifting, and an N-R control valve 20 for preventing shift shock during shifting from a neutral N range to a reverse R range.

Further, there is provided a 1-2 shift valve 22 for controlling both the flow of line pressure when shifting from a first speed to a second speed and pressure lines connected to friction elements operating when reversing, and a 2-3/4-3 shift valve 24 operating by line pressure and which supplies operating release pressure to a second friction element C2 and operating pressure to a third friction element C3. Also included are an end clutch valve 26 supplying operating pressure to a fourth friction element C4, and a fifth friction element C5 operating by directly receiving hydraulic pressure from the manual valve 14 in the reverse R range. And finally, there is provided a rear clutch release valve 28 for exhausting operational pressure of a first friction element C1 when shifting from a third speed to a fourth speed and controlling the amount of time pressure is supplied to the first friction element C1 when shifting from the fourth speed to the third speed to prevent shift shock.

Referring to FIG. 3, the manual valve 14 used in the hydraulic control system structured as in the above includes a valve body provided with a plurality of ports, and a valve spool 100 moving in unison with the shift select lever inside the valve body.

The valve body comprises a first port 102 communicating with the oil pump 2, second and third ports 104 and 106 communicating with the regulator valve 6 through a drive pressure line and a reverse pressure line, a fourth port 108 which supplies line pressure supplied to the first port 102 to the shift control valve 16 and the input control valve 18 in a drive D range, a fifth port 110 for supplying reverse pressure in the reverse R range, and exhaust ports EX1 and EX2 provided on one end of the valve body.

The valve spool 100 includes a first land 112 for selectively communicating the first and second exhaust ports EX1 and EX2 to the third and fifth ports 106 and 110; a second land 114 for selectively communicating the first port 102 to the third and fifth ports 106 and 110, in the reverse R range, the second port 104 to the first port 102 in the neutral N range, and the second port 104 with the fourth port 108 in the D, 2, and L ranges; and a third land 116 for communicating the first port 102 with the second port 104 in the parking P range. Also, the valve spool 100 includes a connecting portion 118, formed on a side opposite that to which the first land 112 is formed, which is connected to the shift select lever. Further, an exhaust passage 120 is formed along an inside the valve spool 100 from the connecting portion 118 to the second land 114 where an orifice 122 is formed.

When the above valve spool 100 is moved, as shown with the phantom line, to the neutral N range, the hydraulic pressure supplied to the first port 102 controls the regulator valve 6 via the second port 104. However, when the valve spool 100 is moved to the parking P range, lubricating fluid is unable to be supplied to the torque convertor 4.

That is, as shown in FIG. 3, when the valve spool 100 is positioned at the parking P range, as the orifice 122 communicates with the first port 102 and one end of the exhaust passage 120 is in a completely open state, the line pressure supplied from the oil pump 2 passes through the exhaust passage 120 and is completely exhausted therethrough. As a result, pressure is not supplied to the second port 104, even if the same is open, nor is pressure supplied to any other valve.

Accordingly, because lubricating fluid is unable to be supplied to the torque convertor when in the parking P range, if the engine is left to idle for a long period of time, it is possible for the torque convertor and other internal parts of the transmission to become damaged.

SUMMARY OF THE INVENTION

The present invention has been made in an effort to solve the above problems.

It is an object of the present invention to provide a hydraulic control system of an automatic transmission which prevents internal damage to the automatic transmission by enabling lubricating fluid to be supplied to a torque convertor in a parking P range.

To achieve the above object, the present invention provides a hydraulic control system of an automatic transmission including a manual valve, which moves in unison with a shift select lever operated by a user to select lines for each shift range, the manual valve being designed to control the supply of hydraulic pressure, supplied from the oil pump, to a regulator valve by controlling first and second orifices formed on an exhaust passage such that part of line pressure generated by the oil pump can be used as lubricating fluid for the torque convertor.

According to a feature of the present invention, the manual valve comprises a valve body provided with a first port communicating with the oil pump, second and third ports communicating with the regulator valve via a drive pressure line and a reverse pressure line, respectively, a fourth port for supplying line pressure supplied to the first port to a shift control valve and a pressure control valve in a drive D range, a fifth port for supplying reverse pressure in a reverse R range, and first and second exhaust ports which are provided on one side of the valve body for exhausting hydraulic pressure; a valve spool disposed in the valve body and including a first land formed on one end of the valve spool, a second land formed spaced at a predetermined interval from the first land such that the first exhaust port is positioned between the first land and the second land in the parking P range, a third land selectively communicating the first port to the third and fifth ports in the reverse R range, the second port to the first port in a neutral N range, and the second and fourth ports to the first port in D, 2, and L ranges, and a fourth land communicating the first port to the second port in the parking P range; and an exhaust passage provided in an inside of the valve spool, the exhaust passage being formed starting from the first land and extending to the fourth land, the first orifice, having a circumference smaller than that of the exhaust passage, formed between the third and fourth lands and communicating with the first port when in the parking P range, and the second orifice, also having a circumference smaller than that of the exhaust passage, formed between the first and second lands such that the second orifice communicates with the first exhaust port when in the parking P range.

According to another feature of the present invention, diameters of the first and second orifices are identical to prevent the unintentional movement of the valve spool when hydraulic pressure is flowing therethrough.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a schematic view of a manual valve according to a preferred embodiment of the present invention;

FIG. 3 is a schematic view of the prior art manual valve; and

DETAILED DESCRIPTION OF THE PREFERRED EMBODIMENTS

A preferred embodiment of the present invention will now be described in detail with reference to the accompanying drawing.

Figure 1:
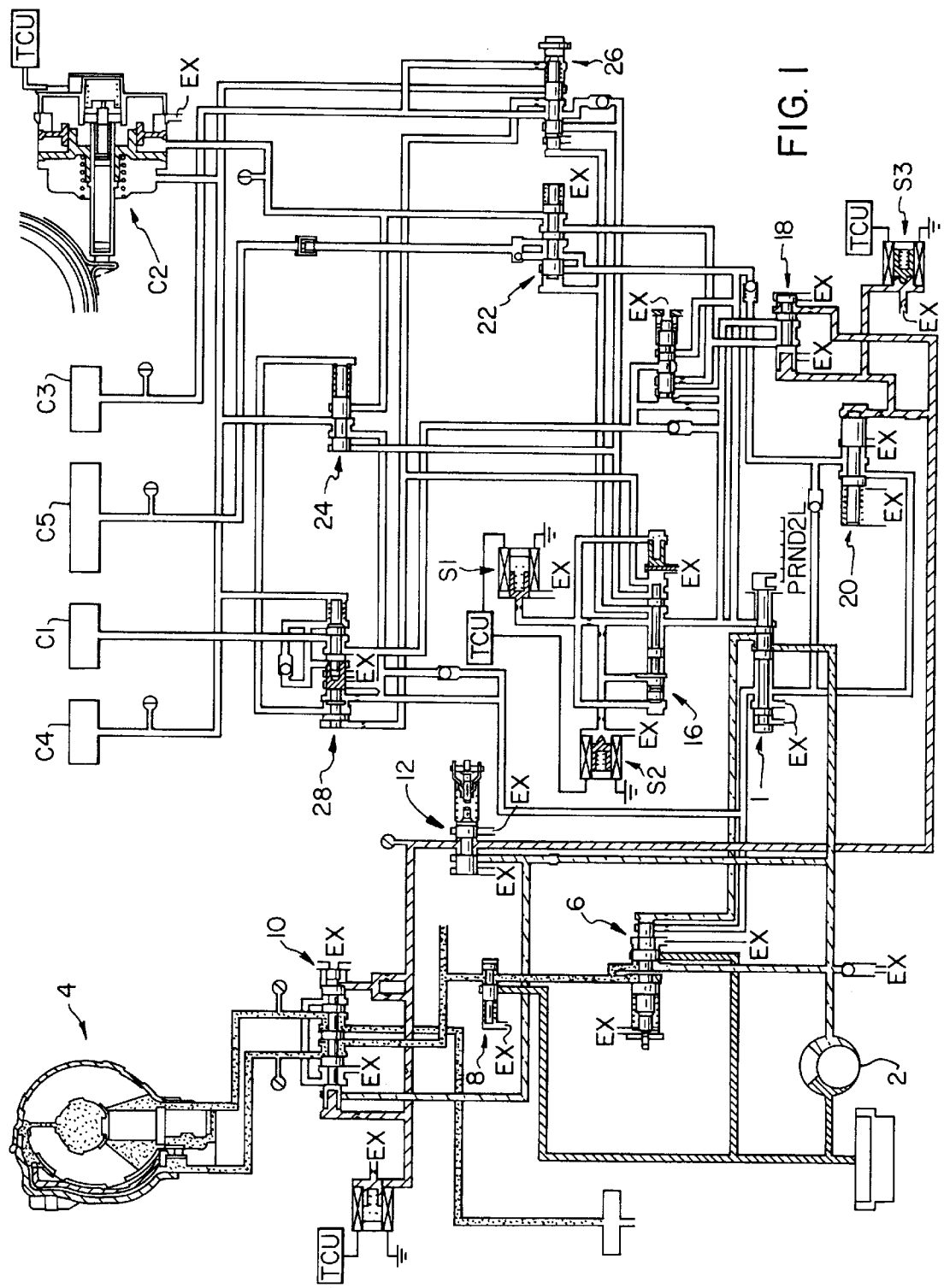
FIG. 1 is a hydraulic circuit diagram of a hydraulic control system to which the present invention according to a preferred embodiment is applied.
Figure 4:
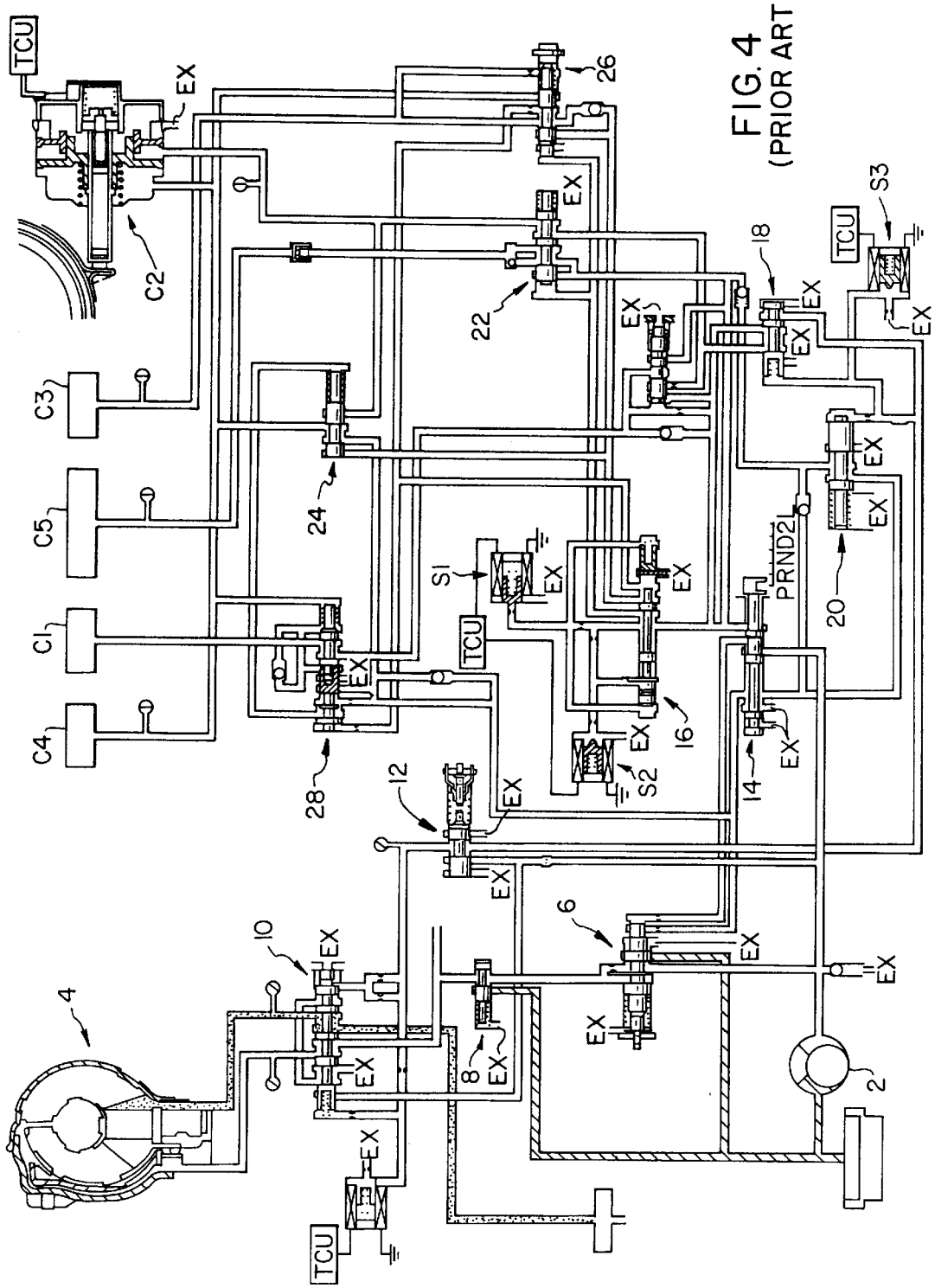
FIG. 4 is a hydraulic circuit diagram of a hydraulic control system to which the prior art manual valve is applied.

Referring to FIG. 1, a hydraulic control system to which the present invention according to a preferred embodiment of the present invention is applied generally includes an oil pump 2 which continuously pumps oil to create hydraulic pressure, a torque convertor 4 for transmitting engine power to an input axle of the transmission, a regulator valve 6 which controls the hydraulic pressure created by the oil pump 2 to a fixed level of pressure, a torque convertor control valve 8 for controlling the hydraulic pressure of the torque convertor 4 and that for lubrication to a fixed level, and a damper clutch control valve 10 for controlling hydraulic pressure operating on a damper clutch mounted in the torque convertor 4.

There is further provided a reducing valve 12 which reduces hydraulic pressure to a fixed level below line pressure, a manual valve 1 moving in unison with a shift select lever (not shown) and which converts lines to supply or exhaust line pressure to or from each valve, and a shift control valve 16 for converting lines by ON/OFF operations of two shift control solenoid valves S1 and S2. Also, the hydraulic control system includes an input control valve 18 controlled by an input control solenoid S3 and which prevents shift shock during shifting, and an N-R control valve 20 for preventing shift shock during shifting from a neutral N range to a reverse R range.

Further, there is provided a 1-2 shift valve 22 for controlling both the flow of line pressure when shifting from a first speed to a second speed and pressure lines connected to friction elements operating when reversing, and a 2-3/4-3 shift valve 24 operating by line pressure and which supplies operating release pressure to a second friction element C2 and operating pressure to a third friction element C3. Also included are an end clutch valve 26 supplying operating pressure to a fourth friction element C4, and a fifth friction element C5 operating by directly receiving hydraulic pressure from the manual valve 1 in the reverse R range. And finally, there is provided a rear clutch release valve 28 for exhausting operational pressure of a first friction element C1 when shifting from a third speed to a fourth speed and controlling the amount of time pressure is supplied to the first friction element C1 when shifting from the fourth speed to the third speed to prevent shift shock.

FIG. 2, illustrates the manual valve 1 according to a preferred embodiment of the present invention in detail. As shown in the drawing, the manual valve 1 includes a valve body 31 and a valve spool 30, the valve spool 30 being formed inside the manual valve 1 and which undergoes a rectilinear movement therein to selectively communicate ports of the manual valve 1.

Formed on the valve body 31 of the manual valve 1 are a first port 32 communicating with the oil pump 2, second and third ports 34 and 36 communicating with the regulator valve 6 via a drive pressure line and a reverse pressure line, respectively, a fourth port 38 for supplying line pressure supplied to the first port 32 to the shift control valve 16 and the pressure control valve 18 in a drive D range, a fifth port 40 for supplying reverse pressure in the reverse R range, and first and second exhaust ports EX1 and EX2 which are provided on one side of the valve body 31 for exhausting hydraulic pressure.

The valve spool 30 of the manual valve 1 includes a first land 42 formed on one end of the valve spool 30; a second land 44 formed spaced at a predetermined interval from the first land 42 such that the first exhaust port EX1 is positioned between the first land 42 and the second land 44 in a parking P range; a third land 46 selectively communicating the first port 32 to the third and fifth ports 36 and 40 in the reverse R range, the second port 34 to the first port 32 in the neutral N range, and the second and fourth ports 34 and 38 to the first port 32 in D, 2, and L ranges; and a fourth land 48 communicating the first port 32 to the second port 34 in the parking P range. Further, the manual valve 1 includes a connecting portion 50, which is connected to a shift select lever and is formed on an end of the valve spool 30 opposite that to which the first land 42 is formed.

There is further provided an exhaust passage 52 formed inside the valve spool 30, the exhaust passage 52 being formed starting from the first land 42 and extending to the fourth land 48. A first orifice 54, having a circumference smaller than that of the exhaust passage 52, is formed between the third and fourth lands 46 and 48 and communicates with the first port 32 when in the parking P range. And second orifice 56, also having a circumference smaller than that of the exhaust passage 52, is formed between the first and second lands 42 and 44 such that the second orifice 56 communicates with the first exhaust port EX1 when in the parking P range. Diameters of the first and second orifices 54 and 56 are identical to prevent unintentional movement of the valve spool 30 when hydraulic pressure is flowing therethrough.

The manual valve 1 structured as in the above, except for when in the parking P range, operates identically as that of the prior art manual valve.

When in the parking P range, as shown in FIG. 2, if hydraulic pressure is supplied from the oil pump 2 via the first port 32, not all of the hydraulic pressure is exhausted as in the prior art, but only part of the hydraulic pressure is exhausted by first flowing into the exhaust passage 52 through the first orifice 54 and exiting through the first exhaust port EX1 via the second orifice 56. Here, as the circumferences of the first and second orifices 54 and 56 are smaller than that of the exhaust passage 52, much of the hydraulic pressure is unable to pass therethrough. The remaining hydraulic pressure is supplied to the second port 34.

The hydraulic pressure supplied to the second port 34 then flows through the drive pressure line to the regulator valve 6 such that a valve spool of the same is controlled. Therefore, hydraulic pressure generated by the oil pump 2 is able to be supplied to the torque convertor 4 by working its way to the regulator valve 6, a torque convertor control valve 8, and finally to a damper clutch control valve 10. By this action, the torque convertor 4 is lubricated in the parking P range as indicated by the shading in the drawing.

With the supply of lubricating fluid to the torque convertor 4 in the parking P range, the automatic transmission will not become damaged even when idling for long periods.

In FIG. 1, the dotted line indicates the line pressure line, the reverse slash line \\\\\\ indicates the reducing line, and the slash line /////// indicates the pump pressure line.

With the improvement of the manual valve according to a preferred embodiment of the present invention as in the above, internal damage to the automatic transmission is prevented by enabling lubricating fluid to be supplied to a torque convertor in a parking P range.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system for an automatic transmission, which has a plurality of friction elements for selectively transmitting rotational force of a torque convertor to gear elements of the automatic transmission, controls engagement of the plurality of friction elements in proportion to forward and reverse speeds by operation of a plurality of valves for regulating, controlling and distributing hydraulic fluid supplied by an oil pump, the hydraulic control system comprising:

a manual valve moving based on operation of a shift select lever by a user to select an operation range, the manual valve controlling supply of the hydraulic fluid to at least one of the plurality of valves such that the hydraulic fluid supplied by the oil pump is used as lubricating fluid for the torque convertor when the shift select lever is in a park operation range.

2. The hydraulic control system of claim 1, wherein the manual valve comprises:

a valve body provided with a first port communicating with the oil pump, second and third ports communicating with a regulator valve of the plurality of valves via a drive pressure line and a reverse pressure line, respectively, a fourth port for supplying hydraulic fluid from the first port to a shift control valve and a pressure control valve of the plurality of valves in a drive operation range, a fifth port for supplying reverse pressure in a reverse operation range, and first and second exhaust ports provided on one side of the valve body for exhausting hydraulic pressure;

a valve spool disposed in the valve body and including a first land formed on one end of the valve spool, a second land formed spaced at a predetermined interval from the first land such that the first exhaust port is positioned between the first land and the second land in the park operation range, a third land selectively communicating the first port to the third and fifth ports in the reverse operation range, the second port to the first port in a neutral operation range, and the second and fourth ports to the first port in drive, second and low operation ranges, and a fourth land communicating the first port to the second port in the park operation range; and wherein the valve spool includes an internally provided exhaust passage and a first and second orifice communicating with the exhaust passage, the exhaust passage formed starting from the first land and extending to the fourth land, the first orifice, having a circumference smaller than a circumference of the exhaust passage, formed between the third and fourth lands and communicating with the first port in the park operation range, and the second orifice, having a circumference smaller than the circumference of the exhaust passage, formed between the first and second lands such that the second orifice communicates with the first exhaust port in the park operation range.

3. The hydraulic control system of claim 2, wherein the first and second orifices have identical diameters.

4. The hydraulic control system of claim 1, wherein the manual valve includes an internal passage and first and second orifices communicating with the internal passage.

5. The hydraulic control system of claim 4, wherein a diameter of the internal passage is greater than diameters of the first and second orifices.

6. The hydraulic control system of claim 5, wherein the diameters of the first and second orifices are equal.

* * * * *